Nov. 14, 1950      F. G. FALES      2,530,351

SEQUENTIAL INSPECTION RECORDER

Filed Dec. 15, 1948      4 Sheets-Sheet 1

INVENTOR.
FORREST G. FALES
BY Lawrence Burns,
ATTORNEY

INVENTOR.
FORREST G. FALES
BY Lawrence Burns,
ATTORNEY

Patented Nov. 14, 1950

2,530,351

UNITED STATES PATENT OFFICE 2,530,351

SEQUENTIAL INSPECTION RECORDER

Forrest G. Fales, Marblehead, Mass., assignor to Sylvania Electric Products Inc., Salem, Mass., a corporation of Massachusetts Application December 15, 1948, Serial No. 65,477

3 Claims. (Cl. 177—311)

This invention relates to sampling inspection work and more particularly to apparatus therefor.

There are several well-known plans for sampling inspection work, one of which is known as the Sequential Inspection Plan. This particular plan is characterized by certain features which make it a desirable one, namely, a minimum of inspection is necessary for a given defectiveness level, and producer and consumer risk. However, the advantage secured by the minimum inspection feature is offset somewhat by certain operational difficulties. For example, the operator, in addition to making the inspection, must remember, upon the occasion of the inspection of each unit in sequence, how many defects have been found and whether, for the total accumulated samples, that number of defects requires (a) passing of the lot, (b) rejection of the lot or (c) continuation of inspection. Furthermore, the maximum gain derived from the sequential inspection plan occurs when the inspection function is truly sequential, i. e., when inspection is made piece-by-piece and not by groups.

The successful use of the plan, therefore, suggests the use of either a graph or a table which should be consulted after the inspection of each unit, and some form of recording must be resorted to in order to keep track of the current status of the lot being inspected. Unless this routine is followed, the inspector is likely to lose track of both the number of articles inspected and the number of defective articles found. In order to simplify the task of recording, the inspector sometimes acquires the habit of inspecting several articles and then formulating an opinion that the lot he is inspecting should be passed or rejected. This practice tends to defeat the minimum inspection feature which characterizes the sequential inspection plan.

Therefore the primary object of this invention is to provide a recording apparatus adapted for employment of the sequential inspection plan.

Another object is to provide an apparatus which gives an instantaneous record of the number of articles inspected.

A further object is to provide an apparatus which gives an instantaneous record of the number of articles found to be defective.

A further object is to provide an apparatus which makes it practically obligatory for the operator to inspect piece-by-piece.

A further object is to provide an apparatus which automatically indicates when a decision has been reached by the device.

A further object is to provide an apparatus which automatically indicates whether the lot under inspection should be accepted or rejected.

Further objects, advantages and features will be apparent from the following description thereof when read in conjunction with the accompanying drawings in which.

Figure 1:
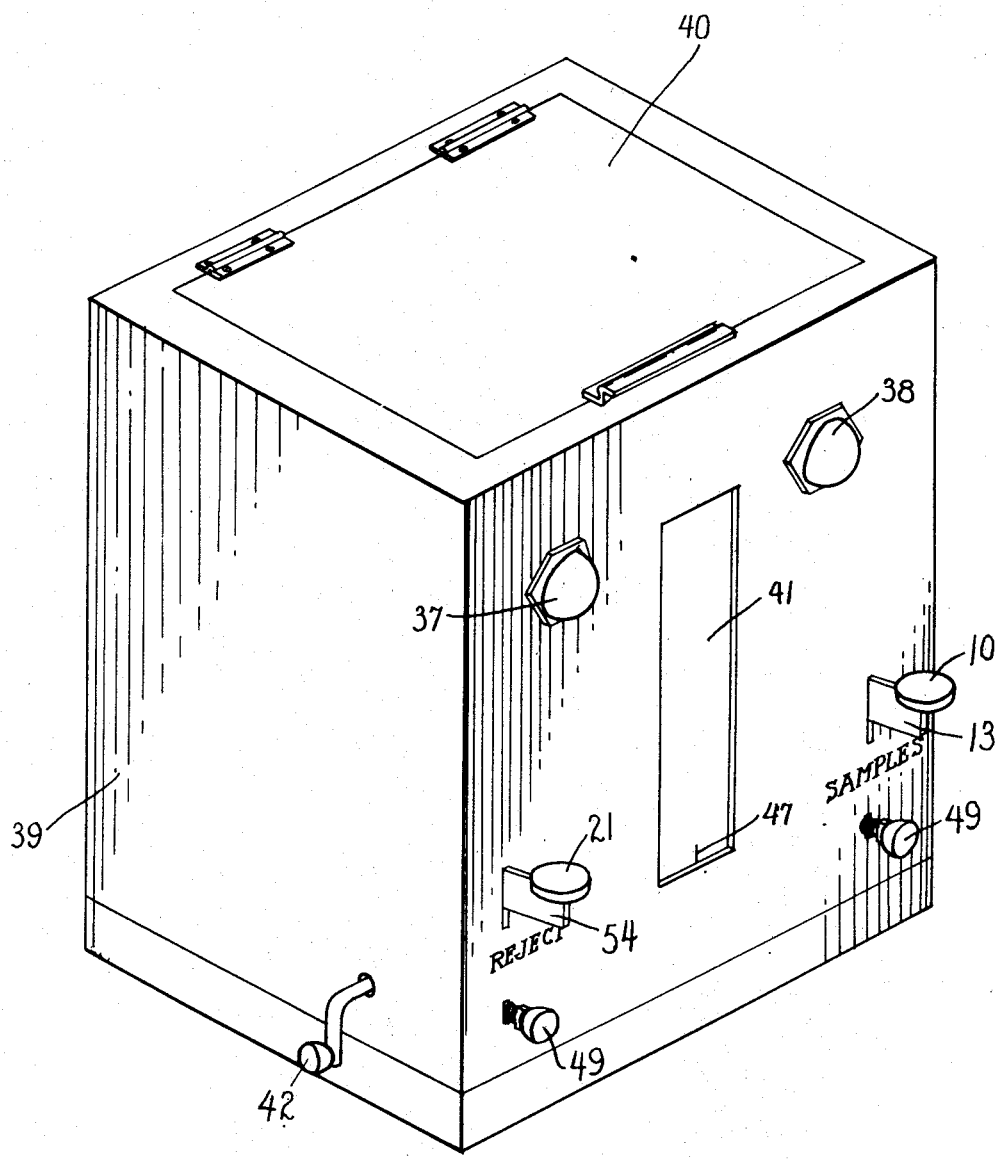
Figure 1 is a perspective view of the apparatus of my invention.
Figure 2:
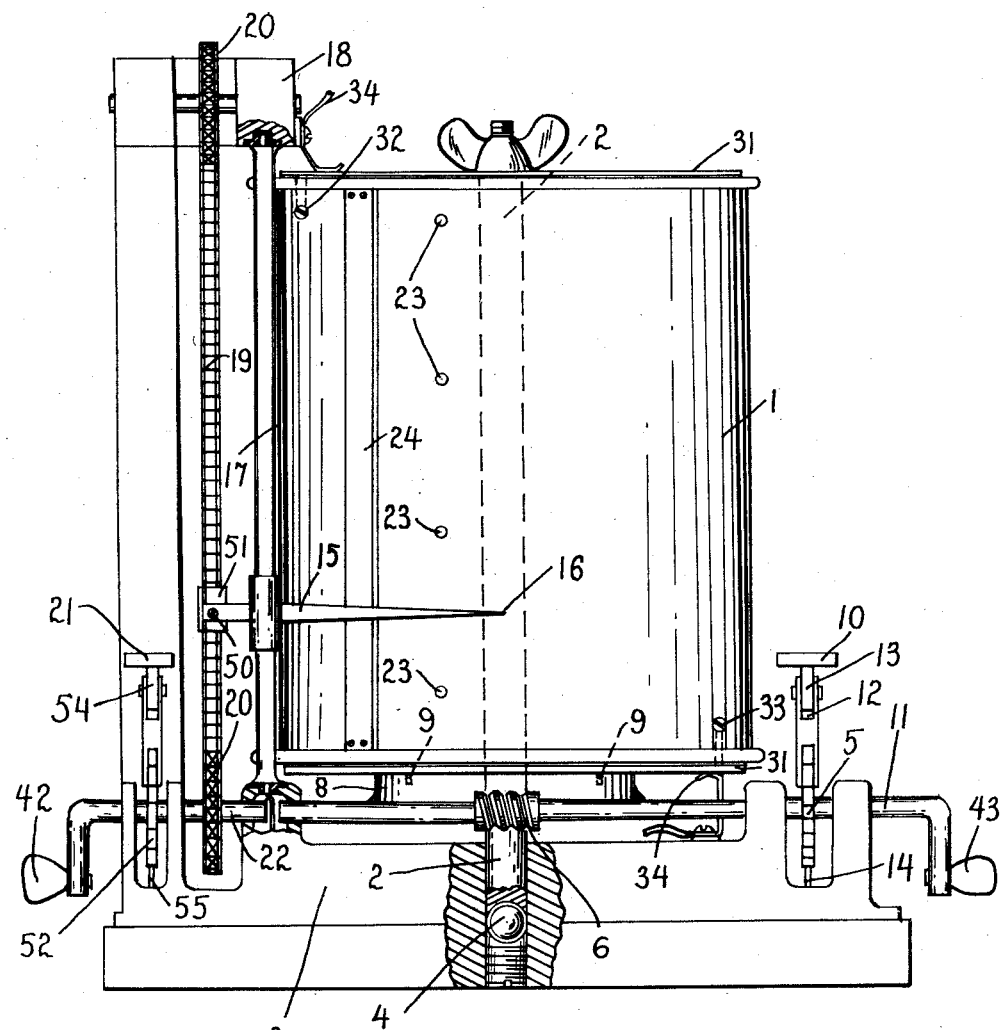
Figure 2 is a front elevational view, partly in section, with the housing removed.
Figure 3:
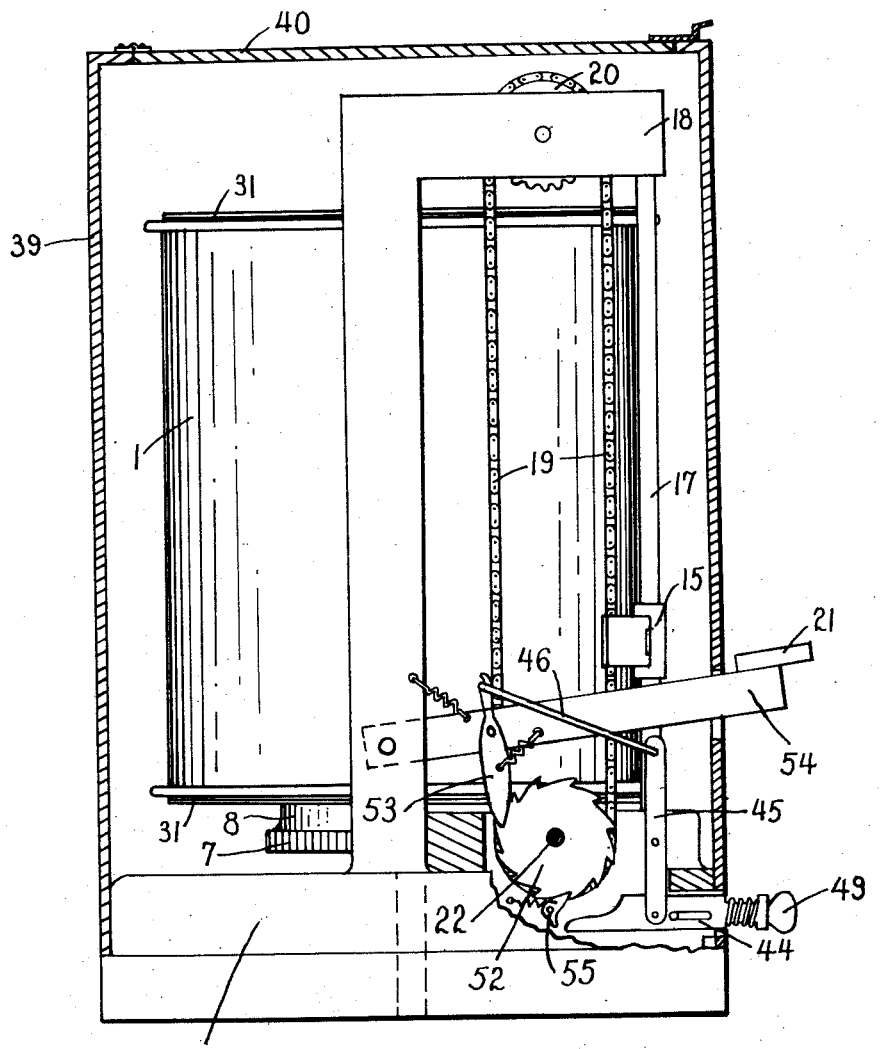
Figure 3 is a side elevational view, partly in section.

In Figures 2 and 3, the apparatus of my invention comprises a removable, rotatable drum 1 mounted on and locked to a shaft 2 which is supported in a base 3 and rotatable therein on a bearing 4. Rotation of the shaft 2 and the drum 1 is effected through a shaft 11 supported in the base 3, a worm 6 mounted on shaft 11 and rotatable therewith, and a gear 7 which meshes with worm 6, and is formed integral with a casting 8. The casting 8 is fixedly mounted on shaft 2. During an inspection cycle, actuation of this mechanism for effecting rotation of the drum 1 is accomplished by depression of a finger key 10. A ratchet wheel-pawl-dog assembly is provided to transform the downward movement of the key 10 into rotation of shaft 11. A ratchet wheel 5, which is keyed to shaft 11, is engaged by a pawl 12 which is pivotally mounted on the key arm 13 and dog 14 which is pivotally mounted in the base 3.

An indicating pointer 15, of electrical conducting material, with an electrical contact 16 on an end thereof, is slidably mounted on a metallic track 17 which is supported in a bracket 18 mounted on the base 3. The other end of the pointer 15 is provided with a pin 50 of insulating material which extends through a block 51. A chain 19, extending substantially parallel to the track 17, is mounted on a pair of sprocket wheels 20 which are supported in the bracket 18. The block 51 slidably engages the chain 19 and the free end of the pin 50 which extends through the block 51 extends through a link of chain 19. Movement of the chain and sprocket drive and the indicating pointer 15 is effected through a shaft 22 which is supported by the base 3, and on which one of the sprocket wheels 20 is mounted. During an inspection cycle, actuation of this mechanism is accomplished by depression of a finger key 21. A ratchet wheel-pawl-dog assembly is provided to transform the downward movement of the key 21 into rotation of shaft 22. A ratchet wheel 52 which is keyed to shaft 22, is engaged by a pawl 53, which is pivotally mounted on the key arm 54, and a dog 55 which is pivotally mounted in the base 3.

The drum 1 is provided with four protruding pins 23 and a locking bar 24 for securing a record card 25 (Figure 4) thereon. The card 25, may vary somewhat from the specific one illustrated depending, for example, on the desired slope of the acceptance and rejection lines in a given case. When the slope of the acceptance and rejection lines has been established, they are marked on the card 25, and metal foil members 26 and 27 are secured to the face of the card. A scale 28, indicating the number of articles inspected, is laid off on the horizontal edge and a scale 29, indicating the number of defective articles is laid off on the vertical edge of the card 25. The card is ruled vertically at each scale unit and horizontally at each ten scale units, defining coordinates 48. Although the coordinates 48 and the single units of scale 28 are only partially shown, it is understood, of course, that the coordinates 48 extend the length of the acceptance and rejection lines, and the scale 28 will bear single unit markers up to the 500 mark.

Figure 4:
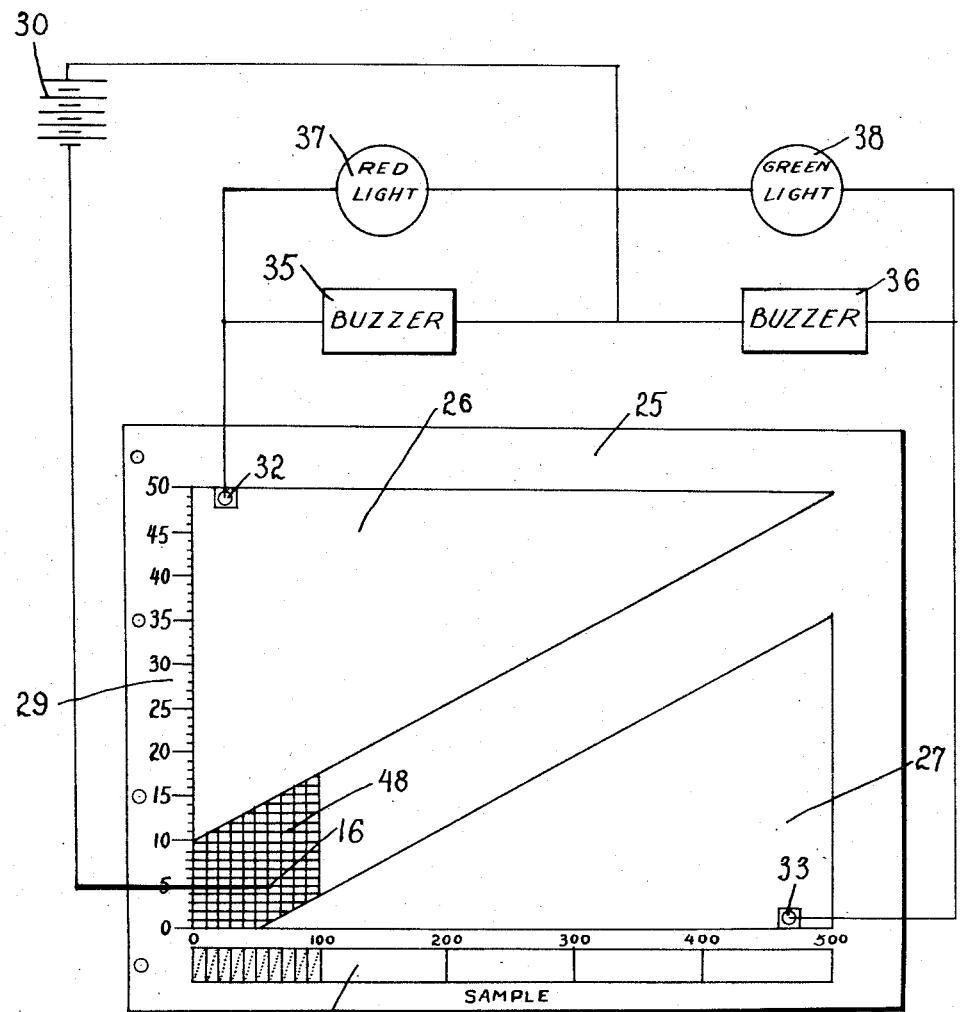
Figure 4 is a plan view of the inspection card and a schematic diagram of the electrical circuit to which the card is connected.

Metal foil members 26 and 27 are electrically connected to source of electrical energy 39 through an audio and video indicating system as shown schematically in Figure 4. The top and bottom of the drum 1 are provided with circumferential rings 31, to which metal foil members 26 and 27 are connected through screw contacts 32, and 33 respectively. Contact brushes 34 mounted on bracket 18 and base 3 but insulated therefrom, are provided to complete the electrical circuit from the metal foil members 26 and 27 to the audio and video indicating system. The audio portion of the system comprises a buzzer 35 connected to the screw contact 32, and a buzzer 36 connected to the screw contact 33. The video portion of the system comprises a red indicator light 37 connected to the screw contact 32, and a green indicator light 38 connected to the screw contact 33. One end of the source of electrical energy 39 is connected through the track 17 and the pointer 15 to the contact 16 on an end thereof.

The apparatus of my invention is enclosed in a suitable cabinet 39 which is provided with a hinged cover 40 which may be opened to permit insertion and withdrawal of the drum 1. The front face of the cabinet 39 is provided with a window 41 to enable an operator to view the card 25. A reading line or marker 47 is etched on the window 41 to enable an operator to read scale 28. The indicator lights 37 and 38 are located on the front face of the cabinet 39 within view of an operator, whereas the buzzers 35 and 36 may be located inside the cabinet.

A positioning crank 42 is attached to the outside end of shaft 22 and a positioning crank 43 is attached to the outside end of shaft 11. These positioning cranks 42 and 43 are provided for returning the pointer 15 and the drum 1 to starting position after an inspection cycle has been completed. A suitable mechanism is provided to effect disengagement of ratchet wheel 52 by pawl and dog 55, and thereby permit an operator to turn positioning crank 42 and return the pointer 15 to starting position. A similar mechanism is provided to permit an operator to turn positioning crank 43 and return drum 1 to starting position.

As shown in Figure 3, this mechanism comprises a spring loaded button 49 mounted on the outside end of a plate 44, a link 45 pivotally mounted on base 3 and pivotally connected at its ends to the plate 44 and a hook 46, the other end of the hook 46 encircling pawl 53. Return of pointer 15 to starting position is accomplished by pushing inwardly on button 49 and turning crank 42. When the button 49 is pushed inwardly, the link 45 rotates clockwise, causing the inside end of plate 44 to push dog 55 out of engagement with ratchet wheel 52. This also causes the hook 46 to pull pawl 53 out of engagement with ratchet wheel 52.

The operation of the apparatus of my invention is quite simple and it does not require the attention of a highly skilled operator. The operator inspects each lot, piece-by-piece, until the apparatus indicates that the lot is to be accepted or rejected. The operator depresses key 10 each time he inspects an article. Depression of key 10 effects clockwise rotation of the drum 1 one unit on scale 28. If the article is defective, the operator also depresses key 21. Depression of key 21 actuates the chain and sprocket drive 19 and 20 and causes the indicating pointer 15 to move upwardly one unit on scale 29. A study of the card 25 reveals that for each article inspected there is relative horizontal motion between the pointer 15 and the coordinates 48 a distance equal to one unit on the scale 28. For each defective article inspected the pointer 15 moves vertically a distance equal to one unit on scale 29.

The operator continues the inspection of the articles, piece-by-piece, until the contact 16 on the pointer 15 engages either metal foil member 26 or metal foil member 27. Engagement of metal foil member 26 by contact 16 closes the circuit therethrough and causes buzzer 35 to sound and the red light 37 to glow, thus indicating that the lot under inspection should be rejected.

Engagement of metal foil member 27 by contact 16 closes the circuit therethrough and causes buzzer 36 to sound and the green light 38 to glow, thus indicating that the lot under inspection should be accepted. This completes the inspection cycle.

What I claim is:

1. An inspection recording and indicating apparatus comprising; a frame for supporting the apparatus; a drum; a shaft on which the drum is supported, said shaft being rotatably mounted in said frame; a record card attached to said drum; electrical-conducting acceptance and rejection indicating means on a face of said record card; a track of electrical conducting material disposed adjacent said drum and extending substantially parallel thereto, along the longitudinal axis thereof; an electrical conducting indicating pointer slidably mounted on said track, an end thereof being engageable with said card; means for effecting indexing linear movement of said pointer along said track a pre-determined indexing unit distance; means for effecting indexing rotational movement of said drum a predetermined indexing unit distance; an acceptance-indicating electrical circuit; means electrically connecting the acceptance-indicating means on the card to the acceptance-indicating circuit; a rejection-indicating electrical circuit; means electrically connecting the rejection-indicating means on the card to the rejection-indicating circuit; and a source of electrical energy to which both of said circuits are connected.

2. An inspection recording and indicating apparatus comprising; a frame for supporting the apparatus; a drum; a shaft on which the drum is supported, said shaft being rotatably mounted in said frame; a record card attached to said drum; substantially parallel spaced acceptance and rejection lines delineated transversely on said card; a coordinate system inscribed on said card in the space between said acceptance and rejection lines; a foil member of conducting material secured to said card and having an edge thereof coinciding with said acceptance line; a second foil member of conducting material secured to said card and having an edge thereof coinciding with said rejection line; a track of electrical conducting material disposed adjacent said drum and extending substantially parallel thereto along the longitudinal axis thereof; an electrical conducting indicating pointer slidably mounted on said track, an end thereof being engageable with the coordinate system on said card; means for effecting indexing linear movement of said pointer along said track a pre-determined indexing unit distance; means for effecting indexing rotational movement of said drum a predetermined indexing unit distance; an acceptance-indicating electrical circuit; means electrically connecting the first mentioned foil member to the acceptance-indicating circuit; a rejection-indicating electrical circuit; means electrically connecting the second-mentioned foil member to the rejection-indicating circuit; and a source of electrical energy to which both of said circuits are connected.

3. An inspection recording and indicating apparatus comprising; a frame for supporting the apparatus; a drum; a shaft on which the drum is supported, said shaft being rotatably mounted in said frame; a record card attached to said drum; substantially parallel spaced acceptance and rejection lines delineated transversely on said card; a coordinate system inscribed on said card in the space between said acceptance and rejection lines; a foil member of conducting material secured to said card and having an edge thereof coinciding with said acceptance line; a second foil member of conducting material secured to said card and having an edge thereof coinciding with said rejection line; a scale laid off along the vertical axis of said card and adjacent an edge thereof; a second scale laid off along the horizontal axis of said card and adjacent an edge thereof; a track of electrical conducting material disposed adjacent said drum and extending substantially parallel thereto along the longitudinal axis thereof; an electrical conducting indicating pointer slidably mounted on said track, an end thereof engageable with the coordinate system on said card; means for effecting indexing linear movement of said pointer along said track a pre-determined indexing unit distance; means for effecting indexing rotational movement of said drum a pre-determined indexing unit distance; an acceptance-indicating electrical circuit, means electrically connecting the first mentioned foil member to the acceptance-indicating circuit; a rejection-indicating electrical circuit; means electrically connecting the second-mentioned foil member to the rejection-indicating circuit and a source of electrical energy to which both of said circuits are connected.

FORREST G. FALES.

REFERENCES CITED

The following references are of record in the file of this patent:

UNITED STATES PATENTS

| Number | Name | Date |
|---|---|---|
| 1,486,576 | Hafer | Mar. 11 1924 |
| 1,995,594 | Wunsch | Mar. 26, 1935 |
| 2,398,988 | Zeibolz | Apr. 23, 1946 |
| 2,419,583 | McDavitt | Apr. 29, 1947 |

FOREIGN PATENTS

| Number | Country | Date |
|---|---|---|
| 1,906 | Great Britain | Sept. 13, 1906 |